United States Patent
Dhingra et al.

(10) Patent No.: US 11,481,821 B2
(45) Date of Patent: Oct. 25, 2022

(54) VEHICLE ALLOCATION FOR FIXED RENTAL RIDES

(71) Applicant: ANI TECHNOLOGIES PRIVATE LIMITED, Bengaluru (IN)

(72) Inventors: Bhavneet Singh Dhingra, Bangalore (IN); Ranjeet Ranjan, Bangalore (IN)

(73) Assignee: ANI TECHNOLOGIES PRIVATE LIMITED, Bengaluru (IN)

( * ) Notice: Subject to any disclaimer, the term of this patent is extended or adjusted under 35 U.S.C. 154(b) by 27 days.

(21) Appl. No.: 16/794,378

(22) Filed: Feb. 19, 2020

(65) Prior Publication Data
US 2020/0265488 A1    Aug. 20, 2020

(30) Foreign Application Priority Data
Feb. 19, 2019    (IN) .............................. 201941006584

(51) Int. Cl.
| | |
|---|---|
| G06Q 30/02 | (2012.01) |
| G01C 21/34 | (2006.01) |
| G08G 1/00 | (2006.01) |
| G06Q 10/02 | (2012.01) |
| G06Q 30/06 | (2012.01) |
| G06Q 50/30 | (2012.01) |

(52) U.S. Cl.
CPC ..... *G06Q 30/0284* (2013.01); *G01C 21/3438* (2013.01); *G01C 21/3453* (2013.01); *G06Q 10/02* (2013.01); *G06Q 30/0645* (2013.01); *G06Q 50/30* (2013.01); *G08G 1/202* (2013.01); *G06Q 2240/00* (2013.01)

(58) Field of Classification Search
CPC . G01C 21/3438; G01C 21/3453; G08G 1/202
See application file for complete search history.

(56) References Cited

U.S. PATENT DOCUMENTS

| | | | |
|---|---|---|---|
| 2011/0213629 A1* | 9/2011 | Clark ..................... | G06Q 10/02 705/5 |
| 2014/0149156 A1 | 5/2014 | Schroeder | |
| 2014/0172727 A1* | 6/2014 | Abhyanker ........ | G06Q 30/0645 705/307 |

(Continued)

FOREIGN PATENT DOCUMENTS

| | | |
|---|---|---|
| CN | 106295828 A | 1/2017 |
| CN | 107403517 A | 11/2017 |

(Continued)

*Primary Examiner* — Victoria E. Frunzi
*Assistant Examiner* — Tayar M Kyu
(74) *Attorney, Agent, or Firm* — Chip Law Group

(57) ABSTRACT

Methods and systems for allocating vehicles for rental rides to customers are provided. A booking request for a rental ride is received from a customer device of a customer. The booking request includes at least a ride distance and a ride duration specified by the customer. Based on the ride duration in the booking request, a predefined ride distance is determined for the rental ride. A ride fare for the rental ride is determined based on at least one of the ride duration, the ride distance specified by the customer, the predefined ride distance, a base fare, and a ride cost per unit distance. Upon confirmation of the ride fare by the customer, an available vehicle is allocated to the customer for rental ride.

13 Claims, 9 Drawing Sheets

(56) References Cited

U.S. PATENT DOCUMENTS

2016/0125662 A1* 5/2016 Fujita ..................... G07B 15/02
                                                        705/13
2017/0365030 A1* 12/2017 Shoham ................. G06Q 10/02
2020/0050198 A1* 2/2020 Donnelly ............. G01C 21/343

FOREIGN PATENT DOCUMENTS

JP              5808148 B2    11/2015
WO           2014036333 A1     3/2014

* cited by examiner

VEHICLE ALLOCATION FOR FIXED RENTAL RIDES

CROSS-RELATED APPLICATIONS

This application claims priority of Indian Application Serial No. 201941006584, filed Feb. 19, 2019, the contents of which are incorporated herein by reference.

FIELD

Various embodiments of the disclosure relate generally to fixed rental rides. More specifically, various embodiments of the disclosure relate to allocation of vehicles to customers for fixed rental rides.

BACKGROUND

Transport service providers, such as cab service providers, offer on-demand vehicle services to various travelers, in addition to various modes of public transportation services that are available for use by the travelers in a geographical region. The public transportation services, though usually cheap, may be inconvenient for few travelers, owing to in-vehicle hassle and lack of last mile connectivity, comfort, or privacy. Such in-vehicle experiences while using the public transportation services discourages the travelers from using the various modes of public transportation services. While the public transportation services are still widely used, private transportation services have gained prominence in recent times. In modern cities, the transport service providers play an important role in providing the private transportation services, such as on-demand cab services, to the travelers for traveling to their desired destinations.

Cab service providers provide different types of rides such as share rides, non-share rides, and rental rides. A share ride allows a first customer to travel from a source location to a destination location by pooling other customers with the first customer in a vehicle. The share rides are typically cheaper than non-share rides. A non-share ride allows a customer to reach her destination location using a vehicle that is not shared by other customers who are unknown to the customer. The share and non-share rides are point-to-point services. The share and non-share rides do not permit customers to book vehicles for specific time durations. The rental rides allow the customers to rent vehicles for the specific time durations. A customer may opt for a rental ride when she requires a vehicle for a specific time duration, for example, in a scenario when she has no fixed drop-off location. For example, the customer may opt for the rental ride when she wishes to take a tour around a city or when she needs the vehicle to go out of the city. When the customer books for the rental ride, the customer may ride in the vehicle for a fixed time duration and/or a fixed ride distance associated with the fixed time duration. The customer may not specify a destination location at the time of booking for the rental ride.

The fixed time duration and ride distance linked with each other may be facilitated by a cab service provider as an option (along with other similar options) to the customer at the time of booking for the rental ride. The customer selects one of the options and requests for the rental ride. Each rental ride is associated with a rental package. The rental package offered by the cab service provider is typically static. The rental package for the rental ride usually depends on the fixed time duration of the rental ride and the fixed ride distance associated with the fixed time duration. Generally, most of the cab service providers offer rental packages that allow the customer to choose only the fixed time duration as a variable. Thus, the rental package is offered to the customer as per the fixed time duration, which has a pre-defined fixed distance component. Thus, when the actual ride distance exceeds the fixed distance component, the cab service provider often levies hefty charges that may not desirable to the customer. This has currently led to decrease in demand for the rental ride services that may not be desirable to the cab service providers. Thus, the current solutions fail to cater the needs of the customers, leading to unsatisfied customers. Currently, there is no mechanism that allows the customer to tailor rental ride parameters according to her needs.

In light of the foregoing, there exists a need for a technical and reliable solution that overcomes the above-mentioned problems and allows the customers to tailor rental ride parameters of the rental rides according to their needs. Furthermore, the solution must also aim to facilitate more flexible rental ride costs for the rental rides that can improve customer's satisfaction, thereby maximizing bookings for the rental rides.

SUMMARY

Vehicle allocation for fixed rental rides is provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

The accompanying drawings illustrate the various embodiments of systems, methods, and other aspects of the present disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Figure 1:
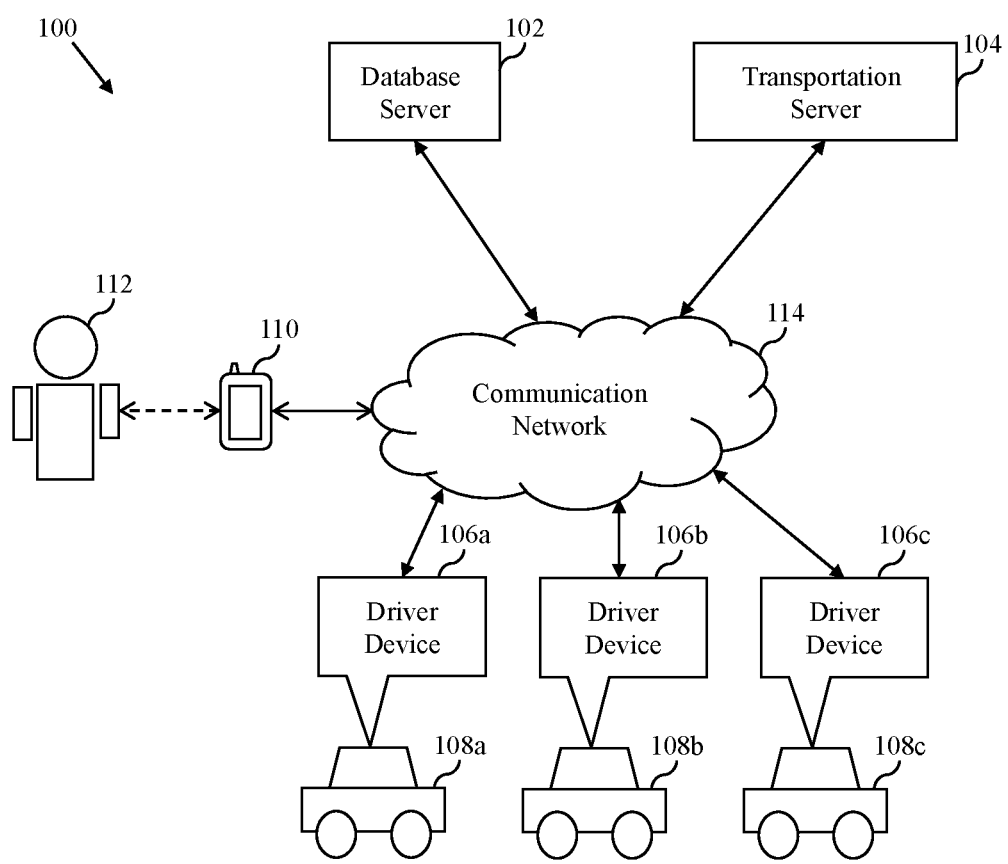
FIG. 1 is a block diagram that illustrates an environment for vehicle allocation, in accordance with an exemplary embodiment of the disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

Certain embodiments of the disclosure may be found in a disclosed apparatus for vehicle allocation. Exemplary aspects of the disclosure provide a method and a system for allocating vehicles to customers for fixed rental rides based on blended pricing facilitated by a cab service provider to the customers. The blended pricing may be facilitated in an online manner. The method includes one or more operations that are executed by circuitry of a transportation server of the system to allocate one or more vehicles to one or more customers for one or more fixed rental rides, respectively, in an online manner. The circuitry may be configured to receive a booking request for a ride from a customer device of a customer. The booking request includes at least a ride duration and a first ride distance specified by the customer. The circuitry may be configured to identify a second ride distance and a base fare associated with the ride duration. The circuitry may be further configured to determine a ride fare for the ride requested by the customer. In an embodiment, the ride fare for the ride may be determined based on the base fare when the first ride distance is less than or equal to the second ride distance. In another embodiment, the ride fare for the ride may be determined based on the ride duration, the first ride distance, the second ride distance, the base fare, and a ride cost per unit distance when the first ride distance is greater than the second ride distance. More specifically, when the first ride distance is greater than the second ride distance, the ride fare is a sum of the base fare and a surcharge. The surcharge is a product of a difference between the first and second ride distances and the ride cost per unit distance. The circuitry may be further configured to render a user interface on the customer device and present at least the determined ride fare for the ride to the customer. The circuitry may be further configured to allocate an available vehicle to the customer based on an acceptance of the ride fare by the customer in the online manner.

Thus, the method and the system of the present disclosure allow one or more customers to tailor rental ride parameters of rental rides according to their needs, and accordingly adjust rental packages for their rental rides. Thus, when a customer agrees to a blended pricing that has been computed based on the rental ride parameters tailored by the customer, an available vehicle is allocated to the customer for the ride by a cab service provider offering rental ride services. Based on the allocation, a driver of the allocated vehicle drives the vehicle from a current location to a pick-up location of the customer, and then transport the customer from the pick-up location to a drop-off location of the customer. During various transitions (such as from the current location to the pick-up location or the pick-up location to the drop-off location), the driver may utilize a digital map rendered by the transportation server in the online manner. Utilization of the digital map may offer accurate direction and fastest route to reach a destination point as per the allocation that may save time for the driver as well as the customer during the ride. Thus, the solution presented through the method and the system of the present disclosure may facilitate flexible rental packages for the rental rides that may help to improve customer's satisfaction, which in turn further help in maximizing bookings for the rental rides.

Terms Description (in Addition to Plain and Dictionary Meaning)

Vehicle is a mode of transport that is deployed by a vehicle transit system, such as a vehicle service provider, to provide vehicle services to one or more customers. For example, the vehicle is an automobile, a bus, a car, a bike, or the like. The one or more customers may travel in the vehicle to commute between their source and destination locations.

Customer is an individual who wants to travel from one location to one or more other locations using a vehicle service offered by a vehicle service provider. For using the vehicle service, the customer initiates a booking request for a ride with the vehicle service provider and provides ride details, such as a source location, a destination location, a vehicle type, a pick-up time, a ride distance, a ride time duration, or a combination thereof.

Driver is an individual who drives a vehicle for providing on-demand vehicle services to one or more customers. The driver may register with a vehicle service provider (e.g., a cab service provider, such as OLA) for providing the on-demand vehicle services to the one or more customers. The driver drives the vehicle to pick the one or more customers from their pick-up locations and then transport the one or more customers to their drop-off locations based on allocation of the vehicle to the one or more customers by the vehicle service provider.

Booking request is a request for a ride, for example, a share-ride, a non-share ride, or a rental ride initiated by a customer. The booking request includes one or more ride components such as a source location, a destination location, a vehicle type, a pick-up time, a ride distance, a ride time duration, or a combination thereof. The various ride components may vary from one ride type to another ride type.

Pick-up location is a point of location in a geographical region from where a customer boards a vehicle for a ride. Prior to boarding the vehicle, the customer initiates a booking request for the ride from the pick-up location or another location that is different from the pick-up location. The pick-up location may be interchangeably used as a source location.

Drop-off location is a point of location in a geographical region where a customer wants to travel from a pick-up location. The customer may or mayn't specify the drop-off location while initiating a booking request for a ride. For example, for a share-ride or a non-share-ride, the customer specifies the drop-off location at the time of initiating the booking request for the share-ride or the non-share-ride. However, for a rental ride, the customer may not specify the drop-off location at the time of initiating the booking request for the rental ride. In such a scenario, the customer may specify the drop-off location to a driver of the allocated vehicle after boarding the vehicle for the rental ride. The drop-off location may be interchangeably used as a destination location.

Rental ride is a ride service offered by a vehicle service provider to a customer for travelling between two or more locations for a fixed ride duration or a fixed ride distance associated with the fixed time duration. The rental ride facilitates additional features (as compared to a share-ride or a non-share ride) in which the customer can enjoy multiple pick-up locations along with multiple drop-off locations. Each rental ride is associated with a fixed rental package.

Ride duration is a time duration for which a customer books a vehicle for a rental ride. The ride duration is further associated with a ride distance (i.e., a pre-defined fixed distance component of the rental ride). Thus, the customer is allowed to ride the allocated vehicle up to the ride duration or the ride distance, whichever reaches first during the ride. In a scenario where the customer extends the rental ride (i.e., beyond the fixed ride distance or ride duration), the customer may be accordingly charged for extending the rental ride.

First ride distance is a ride distance for a rental ride requested by a customer at the time of initiating a booking request for the rental ride. The customer specifies the first ride distance at the time of selecting a fixed time duration associated with the rental ride. The fixed time duration is associated with a second ride distance (i.e., a pre-defined fixed distance component of the rental ride). The first ride distance may be greater than, less than, or equal to the second ride distance.

Base fare for a rental ride is a minimum fare that is payable by a customer for availing the rental ride. The base fare may be determined based on at least one of a ride duration, a pick-up location, a pick-up time, or a vehicle type associated with the rental ride requested by the customer.

Ride cost per unit distance is a cost for a rental ride per unit of distance. The ride cost per unit distance may be determined based on a booking request for the rental ride requested by a customer. For example, the ride cost per unit distance may be determined a ride duration, a pick-up location, a pick-up time, a vehicle type, a degree of real-time demand for rental ride services, an availability of vehicles for the rental ride services, or a combination thereof.

Blended pricing is a mode of pricing (i.e., a ride cost) for a rental ride that is dynamically updated based on variations in at least a ride duration, a ride distance, or a combination thereof.

Allocation information is information associated with allocation of a vehicle to a customer based on a booking request initiated by the customer for a ride. The allocation information includes at least one of a pick-up location of the ride, a pick-up time, vehicle information of the allocated vehicle, driver information of a driver of the allocated vehicle, or customer information of the customer.

Direction information is navigation information including at least one direction for travelling from one location to another location. For example, a customer uses the direction information to reach a pick-up location for a ride. Similarly, a driver of a vehicle allocated to the customer uses the direction information to drive the vehicle from the pick-up location to a drop-off location for the ride requested by the customer. The direction information may be in a form of a graphical representation, a text-based representation, a voice-based representation, or a combination thereof.

FIG. 1 is a block diagram that illustrates an environment 100 for vehicle allocation, in accordance with an exemplary embodiment of the disclosure. The environment 100 includes a database server 102, a transportation server 104, driver devices 106a-106c, vehicles 108a-108c, a customer device 110, and a customer 112. The driver devices 106a-106c are associated with the vehicles 108a-108c, respectively, and the customer device 110 is associated with the customer 112. The database server 102, the transportation server 104, the driver devices 106a-106c, and the customer device 110 may communicate with each other via a communication network 114.

The database server 102 may include suitable logic, circuitry, interfaces, and/or code, executable by the circuitry, that may be configured to perform one or more database operations, such as receiving, storing, processing, and transmitting queries, data, information, messages, or content. The database server 102 may be a data management and storage computing device that is communicatively coupled to the communication network 114 for performing the one or more database operations, such as receiving, storing, processing, and transmitting queries, data, information, messages, or content, such as driver information, vehicle information, customer information, booking information, allocation information, fare information, or the like. The query, data, or content may be received/transmitted from/to various components of the environment 100, such as the transportation server 104, the driver devices 106a-106c, or the customer device 110.

In an exemplary embodiment, the database server 102 may be configured to manage and store the driver information of each driver (such as drivers associated with the vehicles 108a-108c), the vehicle information of each vehicle (such as the vehicles 108a-108c), and the customer information of each customer (such as the customer 112). For example, the driver information of each driver may include information such as a driver's name, a driver's contact number, a driver's rating, a driver's vehicle and its type, or information pertaining to a driver's account registered with a cab service provider. The vehicle information of each vehicle may include information such as a registered vehicle make, a vehicle type, a vehicle capacity, a vehicle number, or other vehicle-related information. The customer information of each customer may include information such as a customer's name, a customer's contact number, a customer's rating, a customer's behavioral information, or information pertaining to a customer's account registered with the cab service provider.

Further, the database server 102 may be configured to manage and store historical booking data, for example, historical demand and supply associated with one or more geographical regions (or one or more routes associated with each geographical region) and historical pick-up and drop-off locations associated with each historical demand and supply. The database server 102 may be further configured to manage and store historical or real-time traffic information along the one or more routes of each geographical region. The database server 102 may be further configured to manage and store real-time booking data, for example, booking requests that are received in real-time from customer devices such as the customer device 110 of the customer 112. The database server 102 may be further configured to manage and store allocation information of one or more vehicles such as the vehicles 108a-108c. The database server 102 may be further configured to manage and store location data of the vehicles 108a-108c. The location data may include latitude, longitude, and/or altitude information representing real-time position of each vehicle.

In an embodiment, the database server 102 may be configured to receive a query from the transportation server 104 via the communication network 114. The query may be an encrypted message that is decoded by the database server 102 to determine a request for retrieving requisite information (such as the vehicle information, the driver information, the customer information, the allocation information, or any combination thereof). In response to the determined request, the database server 102 may be configured to retrieve and communicate the requested information to the transportation server 104 via the communication network 114. Examples of the database server 102 may include, but are not limited to, a personal computer, a laptop, or a network of computer systems.

The transportation server 104 may include suitable logic, circuitry, interfaces, and/or code, executable by the circuitry, that may be configured to perform one or more operations for vehicle allocation. The transportation server 104 may be a computing device, which may include a software framework, that may be configured to create the transportation server implementation and perform the various operations associated with the vehicle allocation. The transportation server 104 may be realized through various web-based technologies, such as, but not limited to, a Java web-framework, a .NET framework, a PHP framework, a python framework, or any other web-application framework. Examples of the transportation server 104 may include, but are not limited to, a personal computer, a laptop, or a network of computer systems.

In an embodiment, the transportation server 104 may be configured to receive the booking request for a rental ride from the customer device 110 via the communication network 114. The booking request may include at least one of a pick-up location, a pick-up time, a preferred vehicle type, a ride duration, and a first ride distance. The transportation server 104 may be configured to identify a second ride distance and a base fare associated with the ride duration. The transportation server 104 may be further configured to determine a ride cost per-unit distance based on at least one of the vehicle type or the pick-up time specified by the customer 112 in the booking request. The transportation server 104 may be further configured to determine a ride fare for the ride. In an embodiment, the ride fare may be determined based on at least the base fare when the first ride distance is less than or equal to the second ride distance. For example, the ride fare may be equal to the base fare when the first ride distance is less than or equal to the second ride distance. In another embodiment, the ride fare may be determined based on at least the ride duration, the first ride distance, the second ride distance, the base fare, and the ride cost per unit distance when the first ride distance is greater than the second ride distance. For example, when the first ride distance is greater than the second ride distance, the transportation server 104 may determine a surcharge based on at least the ride cost per unit distance, the first ride distance, and the second ride distance. For example, the surcharge may be a product of a difference between the first and second ride distances and the ride cost per unit distance. Thus, when the first ride distance is greater than the second ride distance, the ride fare for the ride is a sum of the base fare and the surcharge.

Upon determination of the ride fare for the ride, the transportation server 104 may be further configured to render a user interface on the customer device 110 and present the ride fare for the ride to the customer 112 via the user interface. The user interface may also include one or more selectable options, such as an accept option or a decline option, that offer the customer 112 to provide a preference for the ride based on the ride fare. The customer 112 may accept or decline the ride fare by selecting the accept or cancel option, respectively, presented on the user interface. When the customer 112 selects the decline option and thus declines the ride fare, the transportation server 104 may discard the booking request. However, when the customer 112 selects the accept option and thus accepts the presented ride fare for the ride, the transportation server 104 may determine or identify a set of vehicles (such as the vehicles 108a-108c) that are available for the ride based on the booking request. The transportation server 104 may be further configured to allocate an available vehicle (e.g., the vehicle 108a), selected from the set of available vehicles (e.g., the vehicles 108a-108c), to the customer 112 for the ride.

Based on allocation of the vehicle 108a to the customer 112, the transportation server 104 may be configured to generate allocation information and transmit the allocation information to the customer device 110 and the driver device 106a of the driver of the vehicle 108a. The allocation information may include at least the vehicle information, the driver information, the customer information, the booking information, the fare information, or any combination thereof. In an embodiment, the allocation information may be customized based on a receiving entity, for example, the driver of the vehicle 108a or the customer 112. Further, in an embodiment, based on allocation of the vehicle 108a to the customer 112, the transportation server 104 may be configured to generate and transmit direction information (for example, in the form of a digital map) to the customer device 110 and the driver device 106a. The direction information (on the digital map) presented on the customer device 110 may be utilized by the customer 112 to navigate from a current location to the pick-up location of the ride. The direction information (on the digital map) presented on the driver device 106a may be utilized by the driver to navigate from a current location to the pick-up location of the ride, and thereafter from the pick-up location to the drop-off location associated with the ride. Various components of the transportation server 104 along with their operations have been described in detail in conjunction with FIG. 2.

A person having ordinary skill in the art will understand that the scope of the present disclosure is not limited to realization of the database server 102 and the transportation server 104 as separate entities. In an embodiment, the functionalities of the database server 102 may be integrated into the transportation server 104, or vice-versa, without departing from the spirit of the disclosure. Further, in an embodiment, the transportation server 104 may be realized as an application program installed on and/or running on each of the driver devices 106a-106c and/or the customer device 110, without departing from the spirit of the disclosure.

The driver device 106a may include suitable logic, circuitry, interfaces, and/or code, executable by the circuitry, that may be configured to perform one or more operations. For example, the driver device 106a may be a computing device that is utilized, by the driver of the vehicle 108a, to perform one or more activities or operations by means of a service application (associated with the cab service provider such as OLA) running on the driver device 106a. For example, the driver device 106a may be utilized, by the driver of the vehicle 108a, to view a new booking request communicated by the transportation server 104. The driver device 106a may be utilized, by the driver of the vehicle 108a, to accept or reject the new booking request. The driver device 106a may be utilized, by the driver of the vehicle 108a, to view the customer information and the direction information between two or more locations based on allocation of the vehicle 108a by the transportation server 104. The direction information may be presented in form of the digital map on the driver device 106a. The driver device 106a may be utilized, by the driver of the vehicle 108a, to input preferences for various parameters and/or various types of rides, locations, working time durations, or the like.

In an embodiment, the driver device 106a may be configured to transmit log-in information (such as a log-in time or a log-out time) of the driver of the vehicle 108a to the database server 102 or the transportation server 104 via the communication network 114. The driver device 106a may also periodically transmit the real-time booking status and position information of the vehicle 108a to the database server 102 or the transportation server 104. The real-time booking status information may indicate whether the vehicle 108a is currently occupied or available for the new booking request. The real-time position information may indicate the current location information (e.g., spatial-temporal location information) of the driver device 106a, which in turn is indicative of the current location information (e.g., spatial-temporal location information) of the vehicle 108a. The driver device 106a may include one or more position-tracking sensors for tracking the real-time position information by way of a navigation system, such as a global positioning system (GPS).

In an embodiment, the driver device 106a may be further configured to detect vehicle dynamics information, such as speed, acceleration, deceleration, or the like, of the vehicle 108a and transmit the vehicle dynamics information to the database server 102 or the transportation server 104. In an exemplary embodiment, the driver device 106a may be a vehicle head unit. In another exemplary embodiment, the driver device 106a may be a communication device, such as a smartphone, a tablet, a laptop, or any other portable communication device, that is placed inside the vehicle 108a. Various functionalities of other driver devices, such as the driver devices 106b and 106c, are similar to the functionalities of the driver device 106a, as described above.

The customer device 110 may include suitable logic, circuitry, interfaces, and/or code, executable by the circuitry, that may be configured to perform one or more operations. For example, the customer device 110 may be a computing device that is utilized, by the customer 112, to perform one or more activities or operations by means of a service application (associated with the cab service provider such as OLA) running on the customer device 110. In an exemplary embodiment, the customer device 110 may be utilized, by the customer 112, to schedule the ride such as a rental ride. To schedule the rental ride, the service application running on the customer device 110 may be utilized, by the customer 112, to initiate the booking request for the rental ride and provide booking details of the booking request including at least the pick-up location for the rental ride, the preferred vehicle type, the preferred pick-up time, the ride duration of the rental ride, the first ride distance of the rental ride, or the like. In another embodiment, the customer 112 may utilize the customer device 110 to initiate the booking request by means of a web application hosted by the transportation server 104. Various modes of input that can be utilized, by the customer 112, to initiate the booking request may include, but are not limited to, a touch-based input, a text-based input, a voice-based input, a gesture-based input, or a combination thereof. In an embodiment, the customer device 110 may be configured to transmit the booking request to the transportation server 104 via the communication network 114. In another embodiment, the server application running on the customer device 110 may be configured to transmit the booking request to the transportation server 104 via the communication network 114.

In response to the booking request, the customer device 110 may be configured to receive one or more sets of instructions from the transportation server 104 to render the user interface via the service application. Thereafter, the customer device 110 may be configured to display the user interface including at least the ride fare, the available vehicle and its type, the estimated pick-up time, or the like. The user interface may also include the one or more selectable options, such as the accept or decline option, that enable the customer 112 to accept or decline the initiated rental ride based on the information presented on the user interface. The customer 112 may use one or more input modes (e.g., text-based, voice-based, gesture-based, or touch-based inputs) associated with the customer device 110 to either accept or decline the recommendation associated with the rental ride.

Upon acceptance of the ride fare by the customer 112, the transportation server 104 may be configured to allocate the available vehicle (e.g., the vehicle 108a) to the customer 112 for the rental ride. The customer device 110 may receive the allocation or direction information (corresponding to the booking request) from the transportation server 104 via the service application. The customer device 110 may be further utilized, by the customer 112, to view the allocation or direction information associated with the booking request. The allocation information may include the pick-up location, the driver and vehicle information of the allocated vehicle (e.g., the vehicle 108a), the estimated pick-up time from the pick-up location, or the like. Further, in an embodiment, the customer device 110 may be further utilized, by the customer 112, to view and track the real-time position of the allocated vehicle (e.g., the vehicle 108a). Examples of the customer device 110 include, but are not limited to, a smartphone, a tablet, a laptop, or any other portable communication device.

Figure 2:
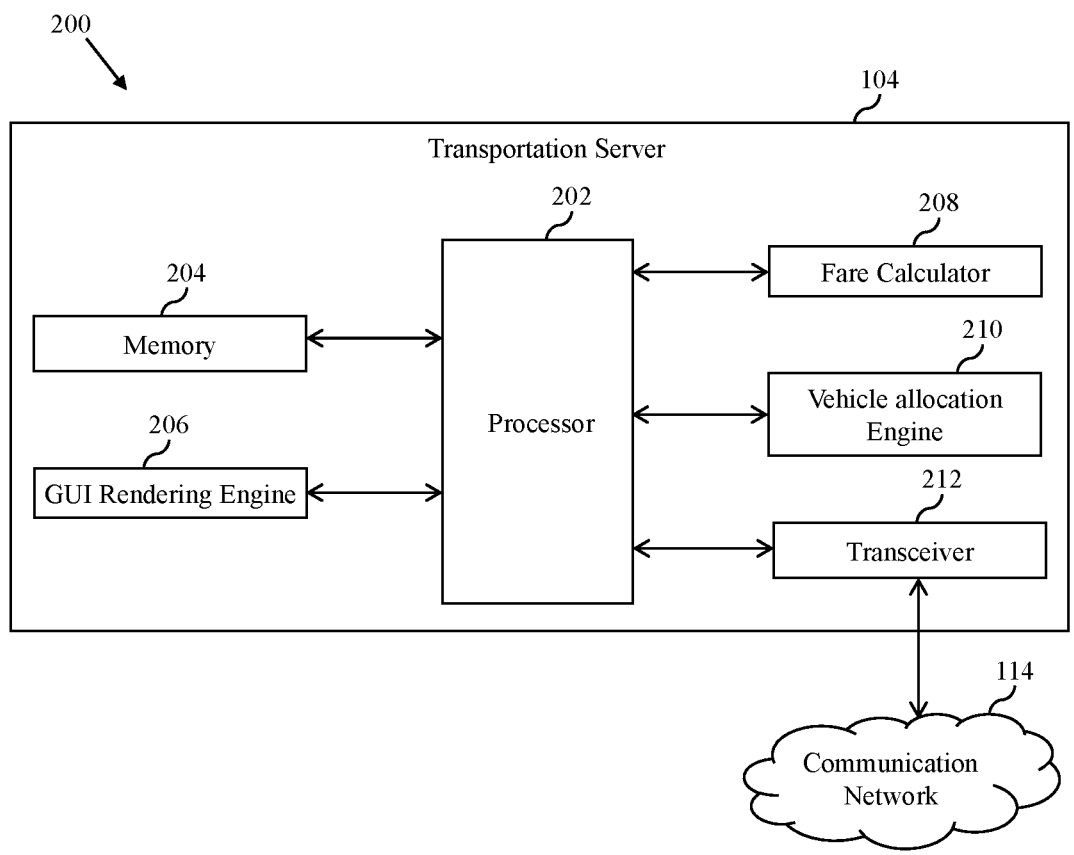
FIG. 2 is a block diagram that illustrates a transportation server of the environment of FIG. 1, in accordance with an exemplary embodiment of the disclosure.

The communication network 114 may include suitable logic, circuitry, interfaces, and/or code, executable by the circuitry, that may be configured to transmit queries, messages, and requests between various entities, such as the database server 102, the transportation server 104, the driver devices 106a-106c, and the customer device 110. Examples of the communication network 114 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities in the environment 100 may connect to the communication network 114 in accordance with various wired and wireless communication protocols, such as Transmission Control Protocol and Internet Protocol (TCP/IP), User Datagram Protocol (UDP), Long Term Evolution (LTE) communication protocols, or any combination thereof FIG. 2 is a block diagram 200 that illustrates the transportation server 104, in accordance with an exemplary embodiment of the disclosure. The transportation server 104 includes circuitry such as a processor 202, a memory 204, a graphical user interface (GUI) rendering engine 206, a fare calculator 208, a vehicle allocation engine 210, and a transceiver 212.

The processor 202 may include suitable logic, circuitry, interfaces, and/or codes, executable by the circuitry, that may be configured to perform the one or more operations for the vehicle allocation. For example, the processor 202 may be configured to process the booking request for the rental ride received from the customer device 110 of the customer 112. Based on processing of the booking request, the processor 202 may be configured to determine at least the pick-up location, the pick-up time, the vehicle type, the ride duration, and the first ride distance associated with the rental ride requested by the customer 112. Further, the processor 202 may be configured to identify the second ride distance and the base fare for the ride duration specified by the customer 112. The second ride distance may be a predefined distance value associated with the ride duration. The processor 202 may query a data structure (stored in the memory 204) including one or more ride durations and their respective predefined ride distances to identify the second ride distance associated with the ride duration specified by the customer 112. The processor 202 may determine the base fare based on at least one of the ride duration, the pick-up location, the pick-up time, or the vehicle type associated with the rental ride. Further, the processor 202 may determine the ride cost per unit distance based on at least one of the pick-up time, the vehicle type, the current demand and supply, or any combination thereof. When the vehicle 108a is allocated to the customer 112, the processor 202 may be configured to determine and transmit, by way of the transceiver 212 via the communication network 114, the allocation and direction information to the customer device 110 of the customer 112, and to the driver device 106a of the driver of the vehicle 108a.

In an embodiment, the processor 202 may be configured to transmit control commands to other circuitry of the transportation server 104, such as the memory 204, the GUI rendering engine 206, the fare calculator 208, the vehicle allocation engine 210, and the transceiver 212, for instructing the memory 204, the GUI rendering engine 206, the fare calculator 208, the vehicle allocation engine 210, and the transceiver 212 to perform their desired operations as per the requirements, as described below. Examples of the processor 202 may include, but are not limited to, an application-specific integrated circuit (ASIC) processor, a reduced instruction set computing (RISC) processor, a complex instruction set computing (CISC) processor, or a field-programmable gate array (FPGA). It will be apparent to a person skilled in the art that the processor 202 is compatible with multiple operating systems.

The memory 204 may include suitable logic, circuitry, interfaces, and/or codes, executable by the circuitry, that may be configured to store one or more instructions that are executed by the processor 202, the GUI rendering engine 206, the fare calculator 208, the vehicle allocation engine 210, and the transceiver 212 to perform their respective operations. In an embodiment, the memory 204 may be configured store the booking request for the rental ride received from the customer device 110 of the customer 112. The memory 204 may be further configured to store the historical data (such as the historical demand and supply), the fare information, the allocation information, the direction information, the customer information, the driver information, the vehicle information, or the like. The memory 204 may be further configured to store the data structure including one or more rows and columns for storing therein the one or more ride durations and their respective predefined ride distances. Examples of the memory 204 may include, but are not limited to, a random-access memory (RAM), a read-only memory (ROM), a programmable ROM (PROM), and an erasable PROM (EPROM).

The GUI rendering engine 206 may include suitable logic, circuitry, interfaces, and/or codes, executable by the circuitry, that may be configured to execute one or more sets of instructions, codes, scripts, and programs stored in the memory 204 to perform one or more operations. In an embodiment, the GUI rendering engine 206 may be configured to render one or more user interfaces on the customer device 110 by means of the service application via the communication network 114, starting from initiation of the booking request for the rental ride till completion of the rental ride. For example, the GUI rendering engine 206 may render a booking user interface on the customer device 110 by using the service application running on the customer device 110, when the customer 112 wants to initiate the booking request for the rental ride. The GUI rendering engine 206 may further render a fare user interface on the customer device 110 by using the service application to communicate about the possible ride fare for the requested rental ride by the customer 112. The fare user interface may further include information pertaining to the available vehicle type for the rental ride, the estimated pick-up time, or the like. The fare user interface may further include the one or more selectable options, such as the accept or decline option, that may enable the customer 112 to either accept or decline the booking proposal based on the information presented on the fare user interface. Upon allocation of the available vehicle (e.g., the vehicle 108a), the GUI rendering engine 206 may render an allocation user interface including the allocation information associated with the allocated rental ride. The GUI rendering engine 206 may further render a map user interface including the digital map that shows at least the current position information of the customer 112 and/or the vehicle 108a. The GUI rendering engine 206 may be implemented by means of one or more processors, such as, but not limited to, an ASIC processor, a RISC processor, a CISC processor, and an FPGA.

The fare calculator 208 may include suitable logic, circuitry, interfaces, and/or codes, executable by the circuitry, that may be configured to execute one or more sets of instructions, codes, scripts, and programs stored in the memory 204 to perform one or more operations. In an embodiment, the fare calculator 208 may be configured to determine the ride fare for the rental ride based on at least the booking request initiated by the customer 112. In one exemplary embodiment, the fare calculator 208 may determine the ride fare for the rental ride based on at least the base fare when the first ride distance is less than or equal to the second ride distance. For example, the ride fare is equal to the base fare when the first ride distance is less than or equal to the second ride distance. In another exemplary embodiment, the fare calculator 208 may determine the ride fare for the rental ride based on at least the ride duration, the first ride distance, the second ride distance, the base fare, and the ride cost per unit distance when the first ride distance is greater than the second ride distance. For example, the ride fare is a sum of the base fare and the surcharge when the first ride distance is greater than the second ride distance. The surcharge may be determined based on a product of a difference between the first and second ride distances and the ride cost per unit distance. The fare calculator 208 may use the equation (1), as shown below, to determine the ride fare when the first ride distance is greater than the second ride distance:

$$\text{Ride fare} = BF + RCPUD * (FRD - SRD) \qquad (1)$$

where,
BF is the base fare for N hours,
RCPUD is the ride cost per unit distance (i.e., per kilometer charge rate),
FRD is the first ride distance specified by the customer 112, and
SRD is the second ride distance associated with the ride duration specified by the customer 112.

The fare calculator 208 may be implemented by means of one or more processors, such as, but not limited to, an ASIC processor, a RISC processor, a CISC processor, and an FPGA.

The vehicle allocation engine 210 may include suitable logic, circuitry, interfaces, and/or codes, executable by the circuitry, that may be configured to execute one or more sets of instructions, codes, scripts, and programs stored in the memory 204 to perform one or more operations associated with the vehicle allocation. In an embodiment, the vehicle allocation engine 210 may be configured to identify, from a set of vehicles associated with the cab service provider, the set of available vehicles (such as the vehicles 108a-108c) for the rental ride based on at least the booking request along with the allocation status and position information of all vehicles. Thereafter, the vehicle allocation engine 210 may be configured to allocate the available vehicle (e.g., the vehicle 108a) to the customer 112 for the rental ride. The allocation of the vehicle 108a to the customer 112 is followed by communication of the allocation and direction information to the customer 112 and the driver of the allocated vehicle 108a. The vehicle allocation engine 210 may be implemented by means of one or more processors, such as, but not limited to, an ASIC processor, a RISC processor, a CISC processor, and an FPGA.

The transceiver 212 may include suitable logic, circuitry, interfaces, and/or codes, executable by the circuitry, that may be configured to transmit (or receive) data to (or from) various servers or devices, such as the database server 102, the driver devices 106a-106c, or the customer device 110, via the communication network 114. For example, the transceiver 212 may receive the booking request for the rental ride from customer device 110 and store the booking request in the memory 204. The transceiver 212 may further transmit at least the allocation and direction information to the customer device 110 and/or the driver device 106a of the driver of the vehicle 108a based on allocation of the vehicle 108a to the customer 112. Examples of the transceiver 212 may include, but are not limited to, an antenna, a radio frequency transceiver, a wireless transceiver, and a Bluetooth transceiver. The transceiver 212 may be configured to communicate with the database server 102, the driver devices 106a-106c, or the customer device 110 using various wired and wireless communication protocols, such as TCP/IP, UDP, LTE communication protocols, or any combination thereof.

Figure 3:
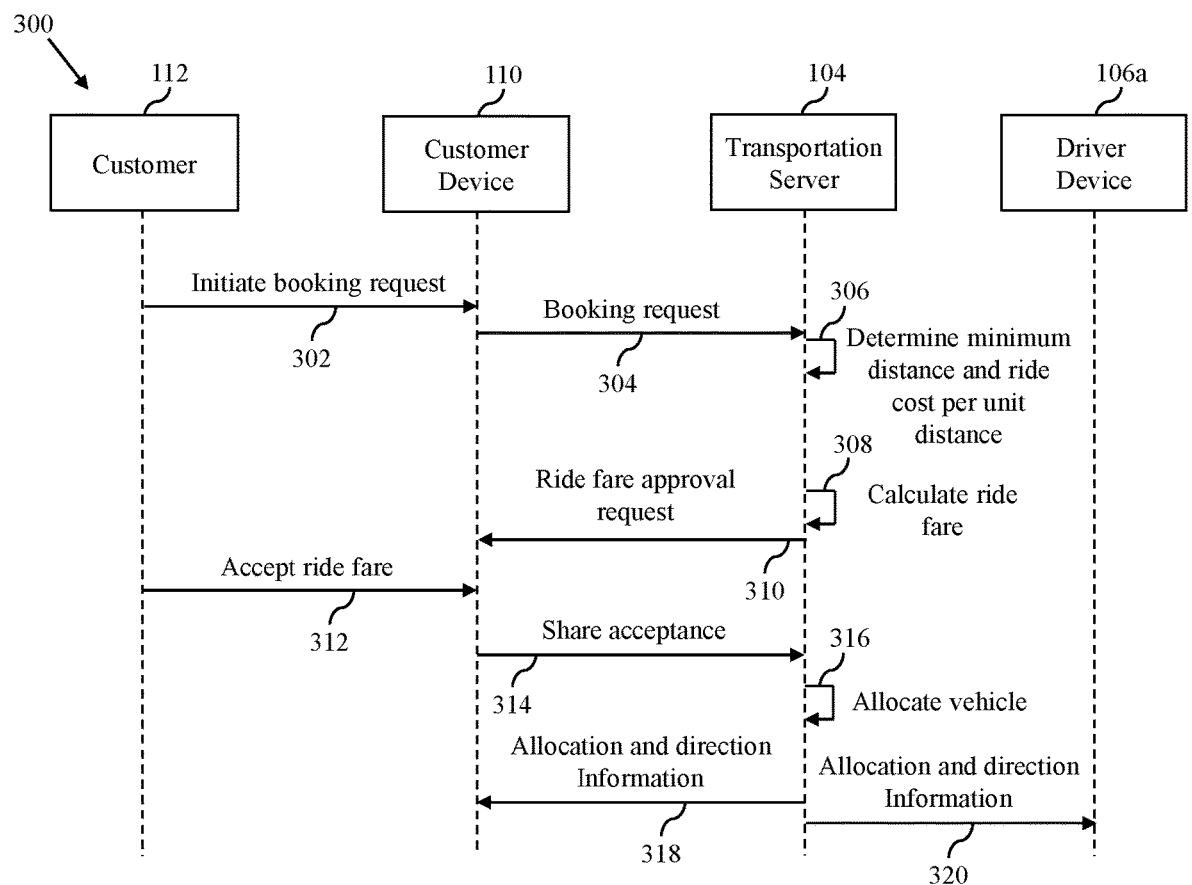
FIG. 3 is a process flow diagram that illustrates allocation of a vehicle to a customer of the environment of FIG. 1, in accordance with an exemplary embodiment of the disclosure.

FIG. 3 is a process flow diagram 300 that illustrates allocation of the vehicle 108a to the customer 112, in accordance with an exemplary embodiment of the disclosure. The process flow diagram 300 shows the transportation server 104, the driver device 106a, the customer device 110, and the customer 112 and various operations therebetween.

The customer 112 initiates the booking request for the rental ride by way of the customer device 110. For the sake of simplicity and without limiting the scope of the disclosure, it is assumed that the customer 112 initiates the booking request by using the service application installed on the customer device 110. The customer 112 also provides various ride details (such as the pick-up location, the pick-up time, the vehicle type, the ride duration, the first ride distance, and/or the like) of the rental ride using the booking user interface rendered by the GUI rendering engine 206 on the customer device 110 (as shown by arrow 302). The customer device 110 transmits the booking request to the transportation server 104 via the communication network 114 (as shown by arrow 304). As described above in conjunction with FIG. 2, the processor 202 identifies the second ride distance and the base fare for the ride based on the ride duration specified by the customer 112. Further, the processor 202 further determines the ride cost per unit distance based on at least the booking request (as shown by arrow 306).

The fare calculator 208 determines the ride fare based on comparison of the first ride distance and the second ride distance. The ride fare may be determined based on at least the base fare when the first ride distance is less than or equal to the second ride distance. The ride fare may be determined based on the ride duration, the first ride distance, the second ride distance, the base fare, and the ride cost per unit distance when the first ride distance is greater than the second ride distance by using equation (1) (as shown by arrow 308). The transportation server 104 transmits a ride fare approval request to the customer device 110 (as shown by arrow 310). The ride fare approval request is presented on the fare user interface that includes at least the ride fare and the accept or decline option. The customer 112 may provide her preference for the ride fare, for example, either accept or decline the ride fare, by selecting one of the accept or decline option. If the customer 112 declines the ride fare, the transportation server 104 discards the booking request. In the current embodiment, it is assumed that the customer 112 selects the accept option and thus accepts the ride fare for the rental ride (as shown by arrow 312). Consequently, the customer device 110 shares the acceptance of the ride fare with the transportation server 104 via the communication network 114 (as shown by arrow 314). Based on the acceptance of the ride fare, the vehicle allocation engine 210 identifies the set of available vehicles (such as the vehicles 108a-108c) and allocates the vehicle 108a for the rental ride to the customer 112 (as shown by arrow 316). Upon allocation of the vehicle 108a to the customer 112 for the rental ride, the transportation server 104 determines the allocation and direction information and shares the allocation and direction information with the customer 112 and the driver of the vehicle 108a (as shown by arrows 318 and 320).

Figure 4A:
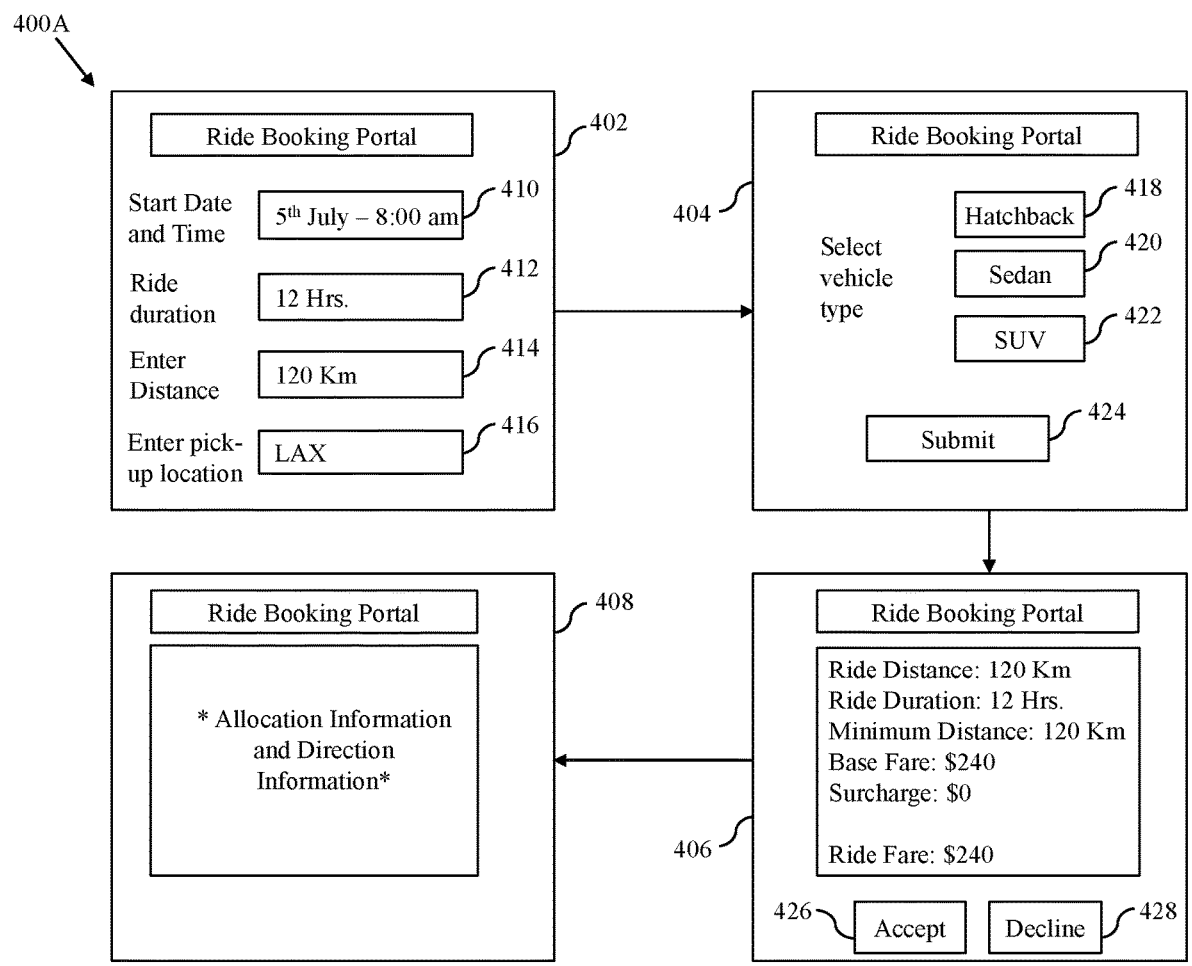
FIG. 4A-4C are block diagrams that illustrate exemplary user interfaces (UIs) rendered on a customer device of the customer, in accordance with an exemplary embodiment of the disclosure.

FIG. 4A is an exemplary scenario 400A that illustrates user interfaces 402-408 rendered on the customer device 110 (one by one), in accordance with an exemplary embodiment of the disclosure. The user interfaces 402-408 are rendered by the GUI rendering engine 206 on the customer device 110 in a sequential manner as shown in FIG. 4A. The user interfaces 402-408 may be rendered on the customer device 110 by means of the service application hosted by the transportation server 104 and installed on the customer device 110. For the sake of simplicity, it is assumed that the customer 112 uses the service application installed on the customer device 110 to book the rental ride.

Upon initiation of the service application on the customer device 110 for initiating the booking request, the user interface 402 is displayed. The user interface 402 includes text boxes 410-416. The user interface 402 displays a first message 'Start date and time', a second message 'Ride duration', a third message 'Enter distance', and a fourth message 'Enter pick-up location', requesting the customer 112 to enter a pick-up date and a pick-up time in the text box 410, a ride duration in the text box 412, a ride distance in the text box 414, and a pick-up location in the text box 416. The customer 112 enters '5$^{th}$ July—8:00 am' as the pick-up date and pick-up time in the text box 410, '12 hrs' as the ride duration in the text box 412, '120 Km' as ride distance in the text box 414, and 'LAX' (i.e., Los Angeles international airport) as the pick-up location in the text box 416. When the customer 112 enters information in the text boxes 410-416, control is redirected from the user interface 402 to the user interface 404. The user interface 404 includes a fifth message requesting the customer 112 to select a vehicle type. The user interface 404 presents selectable options 418-420, representing three vehicle types 'Hatchback', 'Sedan', and 'SUV', respectively. The user interface 404 further includes a submit button 424. The customer 112 may select a vehicle type (say, 'Hatchback') from the selectable options 418-422 and may submit her choice by selecting the submit button 424.

When the customer 112 selects the submit button 424, the transportation server 104 receives the booking request. The booking request includes the pick-up date and time, the ride duration, the ride distance, the pick-up location, and the vehicle type. The transportation server 104 determines the second ride distance and the ride cost per unit distance based on at least the booking request (as described in the foregoing description of FIG. 1). In the current embodiment, the transportation server 104 determines the second ride distance as '120 Km' and a ride cost per unit distance as '$2/Km'. For the sake of simplicity and without limiting the scope of the disclosure, it is assumed that base fare is based only the ride cost per unit distance. In other embodiments, the base fare may be determined based on the ride distance, the ride duration, and/or the vehicle type. Therefore, the base fare is $240 (i.e., 2*120=240). Surcharge is zero, since the ride distance is equal to the second ride distance (i.e., 120 Km). Thus, the ride fare is equal to the base fare (i.e., $240). The GUI rendering engine 206 renders the user interface 406 based on the ride fare. The user interface 406 displays the ride distance, the ride duration, the second ride distance, the base fare, the surcharge, and the ride fare and requests the customer 112 to accept or decline the ride fare. The user interface 406 includes a selectable accept button 426 and a selectable decline button 428. In the current embodiment, the customer 112 accepts the ride fare by selecting the selectable accept button 426. Consequently, the transportation server 104 determines a set of available vehicles. The transportation server 104 allocates a vehicle (say, the vehicle 108a) from the set of available vehicles to the customer 112. The transportation server 104 determines allocation and direction information based on the allocation request. The GUI rendering engine 206 renders the user interface 408 on the service application, displaying the allocation and direction information. In another embodiment, the customer 112 declines the ride fare by selecting the selectable decline button 428. As a result, the transportation server 104 discards the booking request. The GUI rendering engine 206 may render a user interface displaying a 'Booking Request Cancelled' message (not shown).

Figure 4B:
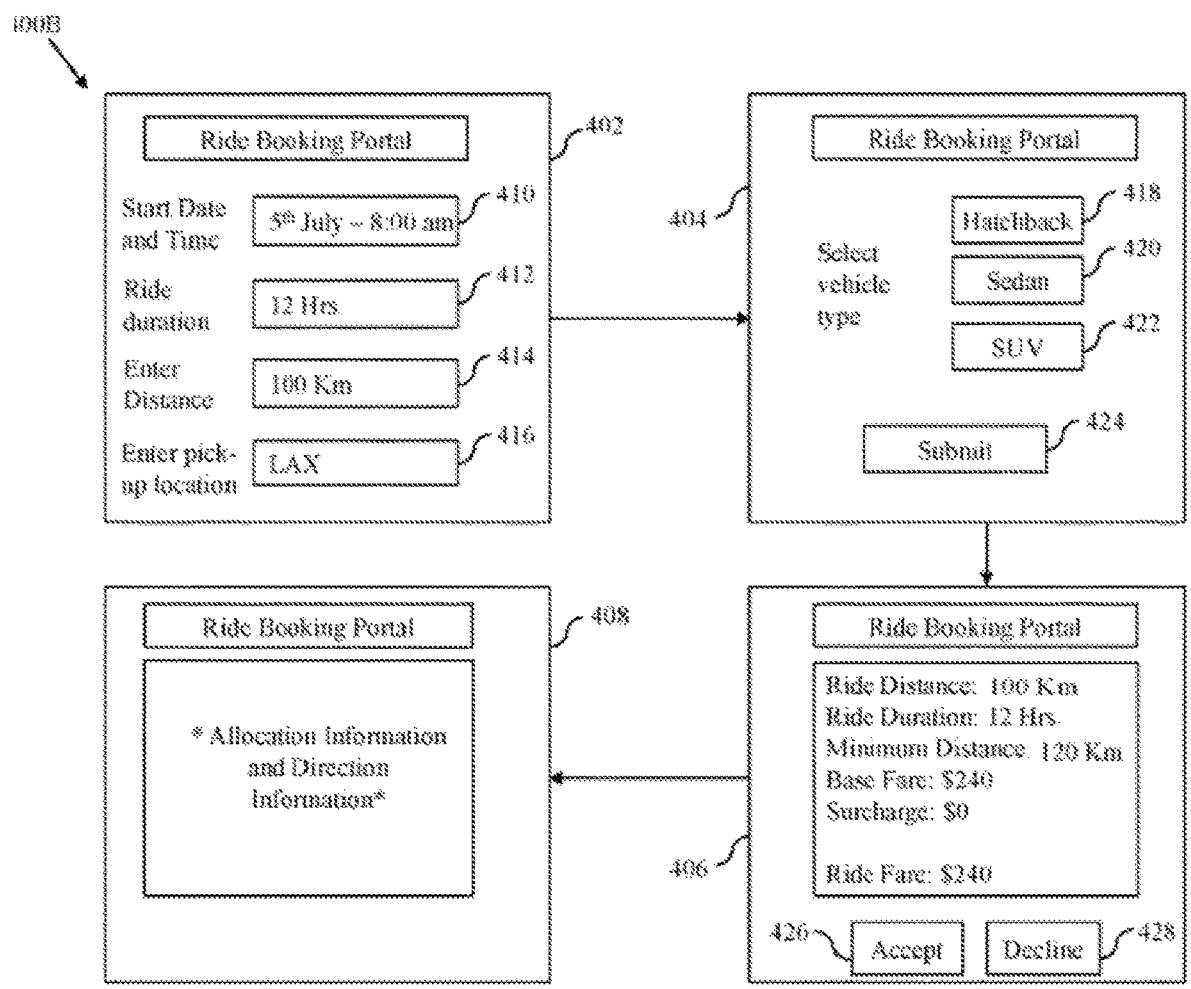

FIG. 4B is an exemplary scenario 400B illustrating user interfaces 402-408 rendered on the customer device 110, in accordance with an exemplary embodiment of the disclosure. The user interfaces 402-408 are rendered by the GUI rendering engine 206 on the customer device 110. The user interfaces 402-408 may be rendered on the service application. For the sake of simplicity, it is assumed that the customer 112 uses the service application installed on the customer device 110 to book the rental ride.

Upon the initiation of the application on the customer device 110, the user interface 402 is displayed. The user interface 402 includes the text boxes 410-416. The user interface 402 displays the first message 'Start date and time', the second message 'Ride duration', the third message 'Enter distance', and the fourth message 'Enter pick-up location', requesting the customer 112 to enter the pick-up date and the pick-up time in the text box 410, the ride duration in the text box 412, the ride distance in the text box 414, and the pick-up location in the text box 416. The customer 112 enters '5$^{th}$ July—8:00 am' as the pick-up date and pick-up time in the text box 410, '12 hrs' as the ride duration in the text box 412, '100 Km' as the ride distance in the text box 414, and 'LAX' (i.e., Los Angeles international airport) as the pick-up location in the text box 416. When the customer 112 enters information in the text boxes 410-416, control is redirected from the user interface 402 to the user interface 404. The user interface 404 includes the fifth message requesting the customer 112 to select the vehicle type. The user interface 404 includes the selectable options 418-422 representing the three vehicle types 'Hatchback', 'Sedan', and 'SUV', respectively. The user interface 404 further includes the submit button 424. The customer 112 may select a vehicle type (say, 'Hatchback') from the selectable options 418-422 and may submit her choice by selecting the submit button. When the customer 112 selects the submit button 424, the transportation server 104 receives the booking request. The booking request includes the pick-up date and time, the ride duration, the ride distance, the pick-up location, and the vehicle type. The transportation server 104 determines the second ride distance and the ride cost per unit distance based on at least the booking request (as described in the foregoing description of FIG. 1). In the current embodiment, the transportation server 104 determines the second ride distance as '120 Km' and the ride cost per unit distance as '$2/Km'. For the sake of simplicity, and without limiting the scope of the disclosure, it is assumed that base fare is based only the ride cost per unit distance. In other embodiments, the base fare may be determined based on the ride distance, the ride duration, and/or the vehicle type. Therefore, the base fare is $240 (i.e., 2*120=240). The surcharge is zero, since the ride distance is less than the minimum distance (i.e., 100 Km<120 Km). Thus, the ride fare is equal to the base fare (i.e., $240).

The GUI rendering engine 206 renders the user interface 406 based on the ride. The user interface 406 displays the ride distance, the ride duration, the minimum distance, the base fare, the surcharge, and the ride fare and requests the customer 112 to accept or decline the ride fare. The user interface 406 includes the selectable accept button 426 and the selectable decline button 428. In the current embodiment, the customer 112 accepts the ride fare by selecting the selectable accept button 426. Consequently, the transportation server 104 determines a set of available vehicles. The transportation server 104 allocates an available vehicle (say, the vehicle 108a) from the set of available vehicles to the customer 112. The transportation server 104 determines the allocation and direction information based on the allocation request. The GUI rendering engine 206 renders the user interface 408 on the service application, displaying the allocation and direction information.

Figure 4C:
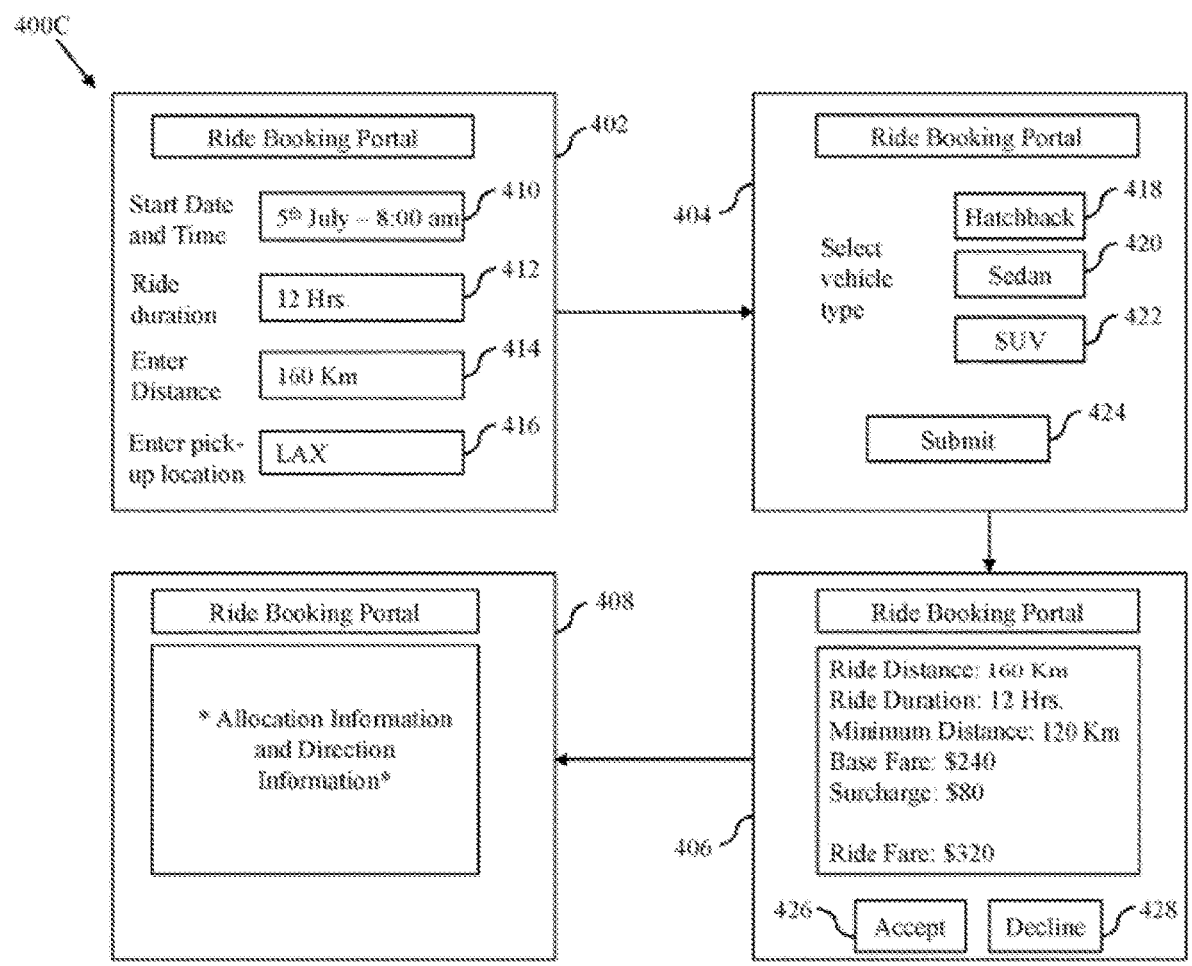

FIG. 4C is an exemplary scenario 400C illustrating user interfaces 402-408 rendered on the customer device 110, in accordance with an exemplary embodiment of the disclosure. The user interfaces 402-408 are rendered by the GUI rendering engine 206 on the customer device 110. The user interfaces 402-408 may be rendered on the service application. For the sake of simplicity, it is assumed that the customer 112 uses the service application installed on the customer device 110 to book a rental ride.

Upon the initiation of the application on the customer device 110, the user interface 402 is displayed. The user interface 402 includes the text boxes 410-416. The user interface 402 displays the first message 'Start date and time', the second message 'Ride duration', the third message 'Enter distance', and the fourth message 'Enter pick-up location', requesting the customer 112 to enter the pick-up date and the pick-up time in the text box 410, the ride duration in the text box 412, the ride distance in the text box 414, and the pick-up location in the text box 416. The customer 112 enters '5$^{th}$ July—8:00 am' as the pick-up date and pick-up time in the text box 410, '12 hrs' as the ride duration in the text box 412, '160 Km' as the ride distance in the text box 414, and 'LAX' (i.e., Los Angeles international airport) as the pick-up location in the text box 416. When the customer 112 enters information in the text boxes 410-416, control is redirected from the user interface 402 to the user interface 404. The user interface 404 includes the fifth message requesting the customer 112 to select the vehicle type. The user interface 404 includes the selectable options 418-422, representing the first through third vehicle types 'Hatchback', 'Sedan', and 'SUV', respectively. The user interface 404 further includes the submit button 424. The customer 112 may select a vehicle type (say, 'Hatchback') from the selectable options 418-422 and may submit her choice by selecting the submit button 424. When the customer 112 selects the submit button 424, the transportation server 104 receives the booking request. The booking request includes the pick-up date and time, the ride duration, the ride distance, the pick-up location, and the vehicle type.

The transportation server 104 determines the second ride distance and the ride cost per unit distance based on at least the booking request (as described in the foregoing description of FIG. 1). In the current embodiment, the transportation server 104 determines the minimum distance as '120 Km' and the ride cost per unit distance as '$2/Km'. For the sake of simplicity, and without limiting the scope of the disclosure, it is assumed that base fare is based only the ride cost per unit distance. In other embodiments, the base fare may be determined based on the ride distance, the ride duration, and/or the vehicle type. Therefore, the base fare is $240 (i.e., 2*120=240). In this scenario, the ride distance is greater than the second ride distance. So, the transportation server 104 determines the surcharge. The surcharge is a product of the ride cost per unit distance and a difference between the ride distance and the second ride distance. The surcharge is $80 (i.e., 2*(160−120)=80). The ride fare is equal to a sum of the base fare and the surcharge (i.e., $240+$80=$320). The GUI rendering engine 206 renders the user interface 406 based on the ride fare. The user interface 406 displays the ride distance, the ride duration, the minimum distance, the base fare, the surcharge, and the ride fare and requests the customer 112 to accept or decline the ride fare. The user interface 406 includes the selectable accept button 426 and the selectable decline button 428. In the current embodiment, the customer 112 accepts the ride fare by selecting the selectable accept button 426. Consequently, the transportation server 104 determines a set of available vehicles. The transportation server 104 allocates an available vehicle from the set of available vehicles to the customer 112. The transportation server 104 determines allocation and direction information based on the allocation request. The GUI rendering engine 206 renders the user interface 408 on the service application, displaying the allocation and direction information.

Figure 5A:
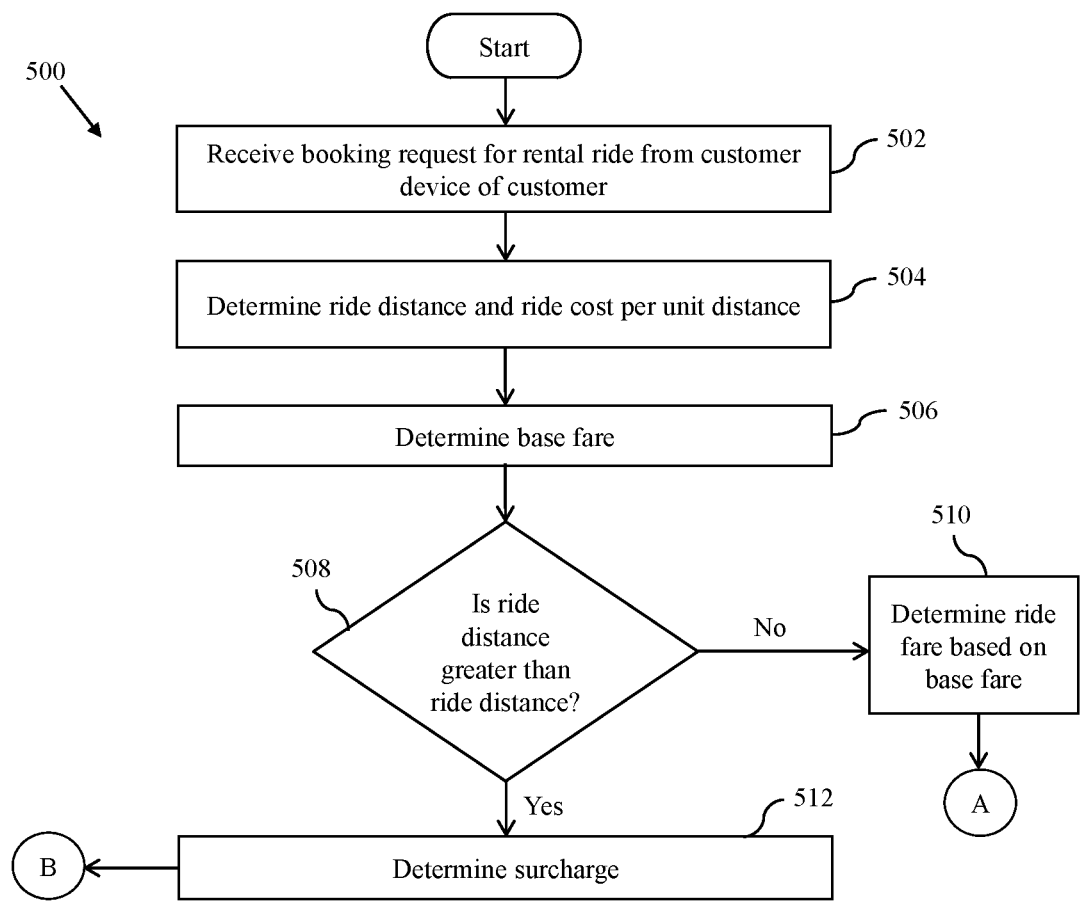
FIGS. 5A and 5B, collectively, represent a flow chart that illustrates a vehicle allocation method for a rental ride, in accordance with an exemplary embodiment of the disclosure.
Figure 5B:
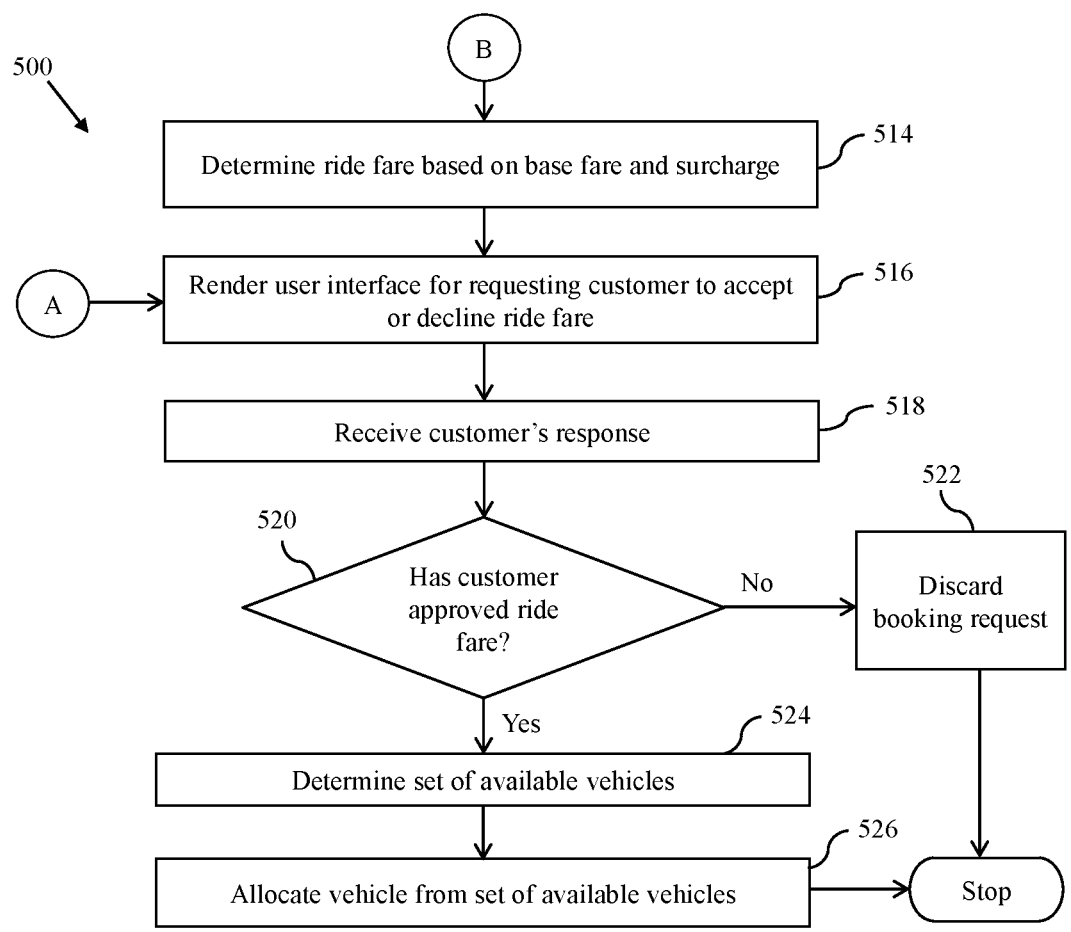

FIGS. 5A and 5B, collectively, represent a flow chart 500 that illustrates a vehicle allocation method for the rental ride, in accordance with an exemplary embodiment of the disclosure.

At 502, the booking request for the rental ride is received from the customer device 110 of the customer 112. The transportation server 104 may be configured to receive the booking request for the rental ride from the customer device 110. The booking request may include at least the ride duration, the first ride distance, the pick-up location and time. The booking request may further include the vehicle type.

At 504, a minimum ride distance (i.e., the second ride distance) and a minimum ride cost per unit distance (i.e., the ride cost per unit distance) are determined. The transportation server 104 may be configured to determine or identify the second ride distance and the ride cost per unit distance based on the booking request.

At 506, the base fare is determined or identified. The transportation server 104 may be configured to determine or identify the base fare based on at least one of the ride duration, the pick-up location, the pick-up time, the vehicle type, the first ride distance, and the minimum ride cost per unit distance.

At 508, a check is performed to determine whether the first ride distance is greater than the second ride distance or not. The transportation server 104 may be configured to determine whether the first ride distance is greater than the second ride distance or not. If, at 508, it is determined that the first ride distance is greater than the second ride distance, then 510 is performed. At 510, the transportation server 104 may be configured to determine the ride fare based on at least the base fare (i.e., the ride fare is equal to the base fare). If, at 508, it is determined that the first ride distance is not greater (i.e., the ride distance is less than or equal to the second ride distance) than the second ride distance, then 512 is performed.

At 512, the surcharge is determined. The transportation server 104 may be configured to determine the surcharge based on the minimum ride cost per unit distance and the difference between the first ride distance and the second ride distance.

At 514, the ride fare is determined based on the base fare and the surcharge. The transportation server 104 may be configured to determine the ride fare based on the base fare and the surcharge (i.e., the ride fare is the sum of the base fare and the surcharge).

At 516, the user interface is rendered on the customer device 110. The transportation server 104 may be configured to render the user interface on the customer device 110 (as described in the description of the user interface 406 of the FIGS. 4A-4C), and request the customer 112 to either accept or decline the ride fare presented on the user interface. The user interface presents at least the ride fare for the rental ride. The transportation server 104, by way of the user interface, requests the customer 112 to either accept or decline the ride fare.

At 518, a customer response is received. The transportation server 104 may be configured to receive the customer response from the customer device 110. The customer response may indicate whether the customer 112 has approved or declined the ride fare. At 520, a check is performed to determine whether the customer 112 has approved or declined the ride fare. The transportation server 104 may be configured to determine whether the customer 112 has approved or declined the ride fare based on the customer response.

At 520, if it is determined that the customer 112 has declined the ride, then 522 is performed. At 522, the transportation server 104 discards the booking request. At 520, if it is determined that the customer 112 has accepted the ride, then 524 is performed. At 524, the set of available vehicles is determined. The transportation server 104 may be configured to determine or identify the set of available vehicles (such as the vehicles 108a-108c). At 526, an available vehicle from the set of available vehicles is allocated. The transportation server 104 may be configured to allocate the available vehicle (such as the vehicle 108*a*) to the customer 112 for the rental ride. The transportation server 104 may be further configured to generate and communicate the allocation and direction information to the customer 112 and the driver of the vehicle 108*a*. Further, based on the allocation, the driver of the vehicle 108*a* may drive the vehicle 108*a* to reach the pick-up location from the current location. The driver may utilize the digital map including the direction information to reach the pick-up location. Further, after the customer 112 has boarded the vehicle 108*a* at the pick-up location, the driver may start the ride and drive the vehicle 108*a* to transport the customer 112 from the pick-up location to the drop-off location. The driver may utilize the digital map including the direction information to reach the drop-off location of the customer 112 from the pick-up location.

Figure 6:
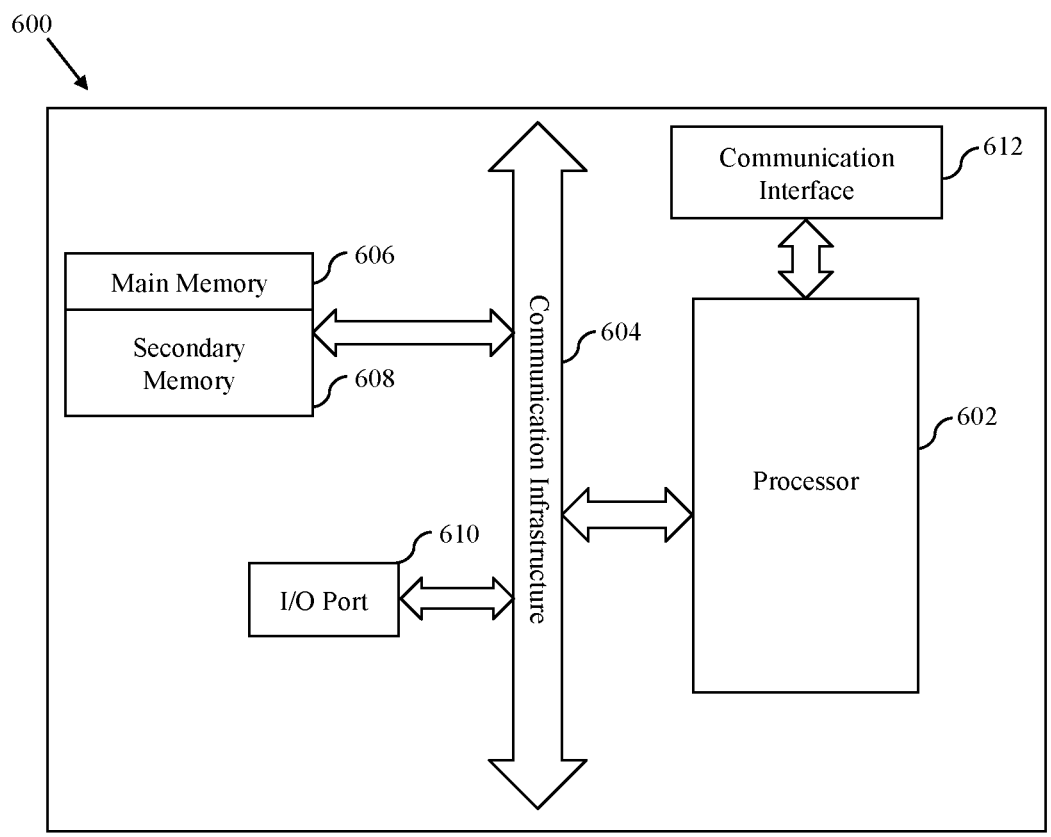
FIG. 6 is a block diagram that illustrates a system architecture of a computer system for allocating vehicles to customers for fixed rental rides, in accordance with an exemplary embodiment of the disclosure.

FIG. 6 is a block diagram that illustrates a system architecture of a computer system 600 for allocating vehicles (such as the vehicle 108*a*) to customers (such as the customer 112) for fixed rental rides (such as the fixed rental ride requested by the customer 112), in accordance with an exemplary embodiment of the disclosure. An embodiment of the disclosure, or portions thereof, may be implemented as computer readable code on the computer system 600. In one example, the database server 102 and the transportation server 104 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the vehicle allocation method of FIGS. 5A and 5B.

The computer system 600 may include a processor 602 that may be a special purpose or a general-purpose processing device. The processor 602 may be a single processor, multiple processors, or combinations thereof. The processor 602 may have one or more processor "cores." Further, the processor 602 may be connected to a communication infrastructure 604, such as a bus, a bridge, a message queue, multi-core message-passing scheme, the communication network 114, or the like. The computer system 600 may further include a main memory 606 and a secondary memory 608. Examples of the main memory 606 may include RAM, ROM, and the like. The secondary memory 608 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 600 may further include an input/output (I/O) port 610 and a communication interface 612. The I/O port 610 may include various input and output devices that are configured to communicate with the processor 602. Examples of the input devices may include a keyboard, a mouse, a joystick, a touchscreen, a microphone, and the like. Examples of the output devices may include a display screen, a speaker, headphones, and the like. The communication interface 612 may be configured to allow data to be transferred between the computer system 600 and various devices that are communicatively coupled to the computer system 600. Examples of the communication interface 612 may include a modem, a network interface, i.e., an Ethernet card, a communication port, and the like. Data transferred via the communication interface 612 may be signals, such as electronic, electromagnetic, optical, or other signals as will be apparent to a person skilled in the art. The signals may travel via a communications channel, such as the communication network 114, which may be configured to transmit the signals to the various devices that are communicatively coupled to the computer system 600. Examples of the communication channel may include a wired, wireless, and/or optical medium such as cable, fiber optics, a phone line, a cellular phone link, a radio frequency link, and the like. The main memory 606 and the secondary memory 608 may refer to non-transitory computer readable mediums that may provide data that enables the computer system 600 to implement the vehicle allocation method illustrated in FIGS. 5A and 5B.

Various embodiments of the disclosure provide the transportation server 104 for allocating one or more vehicles to one or more customers. The transportation server 104 may be configured to receive, from the customer device 110 via the communication network 114, the booking request for the rental ride. The booking request may include at least the ride duration and the first ride distance. Based on the booking request, the transportation server 104 may be configured to identify or determine the second ride distance and the base fare associated with the ride duration. The transportation server 104 may be further configured to determine the ride fare for the rental ride. In one embodiment, the ride fare may be determined based on at least the base fare when the first ride distance is less than or equal to the second ride distance. In another embodiment, the ride fare may be determined based on the ride duration, the first ride distance, the second ride distance, the base fare, and the ride cost per unit distance when the first ride distance is greater than the second ride distance. The transportation server 104 may be further configured to allocate the available vehicle (such as the vehicle 108*a*) selected from the set of available vehicles (such as the vehicles 108*a*-108*c*) to the customer 112 based on at least the ride fare presented to the customer 112 and the acceptance of the presented ride fare by the customer 112 for the rental ride.

Various embodiments of the disclosure provide a non-transitory computer readable medium having stored thereon, computer executable instructions, which when executed by a computer, cause the computer to execute operations for allocating one or more vehicles to one or more customers. The operations include receiving, by the transportation server 104, from the customer device 110 via the communication network 114, the booking request for the rental ride. The booking request may include at least the ride duration and the first ride distance. The operations further include identifying or determining, by the transportation server 104, the second ride distance and the base fare associated with the ride duration. The operations further include determining, by the transportation server 104, the ride fare for the rental ride. In one embodiment, the ride fare may be determined based on at least the base fare when the first ride distance is less than or equal to the second ride distance. In another embodiment, the ride fare may be determined based on the ride duration, the first ride distance, the second ride distance, the base fare, and the ride cost per unit distance when the first ride distance is greater than the second ride distance. The operations further include allocating, by the transportation server 104, the available vehicle (such as the vehicle 108*a*) selected from the set of available vehicles (such as the vehicles 108*a*-108*c*) to the customer 112. The vehicle 108*a* may be allocated to the customer 112 based on at least the acceptance of the ride fare by the customer 112 for the rental ride.

The disclosed embodiments encompass numerous advantages. The disclosure provides various methods and systems for allocating one or more vehicles to one or more customers using blended pricing. The disclosed vehicle allocation methods and systems may allow the one or more customers to tailor rental ride parameters of rental rides according to their needs, and accordingly adjust rental packages for their rental rides. Thus, when a customer (such as the customer 112) agrees to a blended pricing that has been computed based on the rental ride parameters tailored by the customer, an available vehicle (such as the vehicle 108a) is allocated to the customer for the ride by a cab service provider offering rental ride services. Thus, the solution presented through the methods and the systems of the present disclosure may facilitate flexible rental packages for the rental rides that may help to improve customer's satisfaction, which in turn further help in maximizing bookings for the rental rides. Further, based on the allocation, a driver of the allocated vehicle drives the vehicle from a current location to a pick-up location of the customer, and then transport the customer from the pick-up location to a drop-off location of the customer. During various transitions (such as from the current location to the pick-up location or the pick-up location to the drop-off location), the driver may utilize a digital map rendered by the transportation server 104 in the online manner. Utilization of the digital map may offer accurate direction and fastest route to reach a destination point as per the allocation that may save time for the driver as well as the customer during the ride.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for allocating vehicles to customers for fixed rental rides. While various exemplary embodiments of the disclosed allocating systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method, comprising:
   providing, by circuitry of a web-based server, an application operable to present a first interactive user interface on a first electronic device, wherein the first interactive user interface supports a plurality of input modes including a touch-based input, a gesture-based input, a text-based input, and a voice-based input;
   receiving, by the circuitry, from the first electronic device via the first interactive user interface, a booking request for a ride, wherein the booking request comprises a ride duration and a first ride distance inputted through the first interactive user interface using at least one of the plurality of input modes;
   identifying, by the circuitry, a second ride distance and a base fare associated with the ride duration;
   comparing, by the circuitry, the first ride distance and the second ride distance;
   determining, by the circuitry, before an allocation of a vehicle for the ride, a ride fare for the ride based on the comparison of the first ride distance and the second ride distance, wherein the ride fare is equal to the base fare based on the first ride distance being less than or equal to the second ride distance, and wherein the ride fare is greater than the base fare and is determined based on the ride duration, the first ride distance, the second ride distance, the base fare, and a ride cost per unit distance based on the first ride distance being greater than the second ride distance;
   switching, by the circuitry, on the first electronic device, from the first interactive user interface to a second interactive user interface based on the determination of the ride fare such that the second interactive user interface presents the determined ride fare;
   allocating, by the circuitry, the vehicle from a set of available vehicles to the ride based on an acceptance of the determined ride fare received via the second interactive user interface;
   switching, by the circuitry, on the first electronic device, from the second interactive user interface to a third interactive user interface based on the allocation of the vehicle such that the third interactive user interface presents one or more details of the allocated vehicle and a current location of the allocated vehicle that is updated in real-time on the third interactive user interface based on a real-time movement of the allocated vehicle;
   generating, by the circuitry, direction information that navigates the vehicle from the current location of the vehicle to a pick-up location associated with the ride; and
   rendering, by the circuitry, a digital map on a second electronic device of the allocated vehicle, wherein the digital map includes the generated direction information, and wherein the vehicle navigates from the current location of the vehicle to the pick-up location associated with the ride based on the direction information.

2. The method of claim 1, wherein the booking request further comprises a vehicle type, the pick-up location, and a pick-up time for the ride.

3. The method of claim 2, wherein the base fare is identified based on the ride duration, the pick-up location, the pick-up time, and the vehicle type, and wherein the pick-up time refers to a time instance at which a customer is to be picked-up from the pick-up location.

4. The method of claim 1, wherein the ride fare is a sum of the base fare and a surcharge, wherein the surcharge is a product of a difference between the first ride distance and the second ride distance, and the ride cost per unit distance, wherein the ride cost per unit distance depends on a vehicle type and a pick-up time associated with the booking request, and wherein the pick-up time refers to a time instance at which a customer is to be picked-up from the pick-up location.

5. The method of claim 1, further comprising querying, by the circuitry, based on the ride duration included in the booking request, a database including one or more ride durations and a predefined ride distance corresponding to each of the one or more ride durations, wherein the second ride distance is identified from the database based on the querying.

6. The method of claim 1, wherein the second interactive user interface further presents and a plurality of options selectable on the first electronic device before allocation of the vehicle, wherein the determined ride fare is accepted based on a selection of an accept option of the plurality of options, and wherein the accept option is selected using at least one of the plurality of input modes.

7. The method of claim 6, further comprising receiving, by the circuitry from the first electronic device, the acceptance of the ride fare based on the selection of the accept option of the plurality of options on the second interactive user interface.

8. A system, comprising:
a web-based server comprising circuitry configured to:
provide an application operable to present a first interactive user interface on a first electronic device, wherein the first interactive user interface supports a plurality of input modes including a touch-based input, a gesture-based input, a text-based input, and a voice-based input;
receive, from the first electronic device via the first interactive user interface, a booking request for a ride, wherein the booking request comprises a ride duration and a first ride distance inputted through the first interactive user interface using at least one of the plurality of input modes;
identify a second ride distance and a base fare associated with the ride duration;
compare the first ride distance and the second ride distance;
determine, before an allocation of a vehicle for the ride, a ride fare for the ride based on the comparison of the first ride distance and the second ride distance, wherein the ride fare is equal to the base fare based on the first ride distance being less than or equal to the second ride distance, and wherein the ride fare is greater than the base fare and is determined based on the ride duration, the first ride distance, the second ride distance, the base fare, and a ride cost per unit distance based on the first ride distance being greater than the second ride distance;
switch, on the first electronic device, from the first interactive user interface to a second interactive user interface based on the determination of the ride fare such that the second interactive user interface presents the determined ride fare;
allocate the vehicle from a set of available vehicles to the ride on an acceptance of the determined ride fare received via the second interactive user interface;
switch, on the first electronic device, from the second interactive user interface to a third interactive user interface based on the allocation of the vehicle such that the third interactive user interface presents one or more details of the allocated vehicle and a current location of the allocated vehicle that is updated in real time on the third interactive user interface based on a real-time movement of the allocated vehicle;
generate direction information that navigates the vehicle from the current location of the vehicle to a pick-up location associated with the ride; and
render a digital map on a second electronic device of the allocated vehicle, wherein the digital map includes the generated direction information, and wherein the vehicle navigates from the current location of the vehicle to the pick-up location associated with the ride based on the direction information.

9. The system of claim 8, wherein the booking request further comprises a vehicle type, the pick-up location, and a pick-up time.

10. The system of claim 9, wherein the base fare is identified based on the ride duration, the pick-up location, the pick-up time, and the vehicle type, and wherein the pick-up time refers to a time instance at which a customer is to be picked-up from the pick-up location.

11. The system of claim 8, wherein the ride fare is a sum of the base fare and a surcharge, wherein the surcharge is a product of a difference between the first ride distance and the second ride distance, and the ride cost per unit distance, wherein the ride cost per unit distance depends on a vehicle type and a pick-up time associated with the booking request, and wherein the pick-up time refers to a time instance at which a customer is to be picked-up from the pick-up location.

12. The system of claim 8, wherein the second interactive user interface further a plurality of options selectable on the first electronic device before allocation of the vehicle and wherein the determined ride fare is accepted based on a selection of an accept option of the plurality of options, and wherein the accept option is selected using at least one of the plurality of input modes.

13. The system of claim 12, wherein the circuitry is further configured to receive the acceptance of the ride fare based on the selection of the accept option of the plurality of options on the second interactive user interface.

* * * * *